Figure 2:
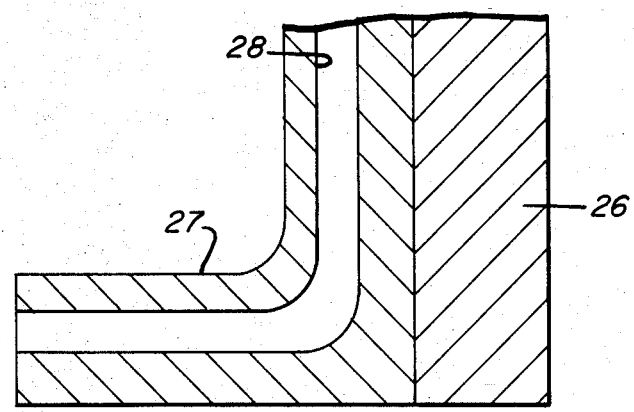

United States Patent [19]

Conti

[11] Patent Number: 4,692,063
[45] Date of Patent: Sep. 8, 1987

[54] SYSTEM TO CONTROL TENSION IN A CABLE DURING UNDERGROUND PLACEMENT

[75] Inventor: Allen C. Conti, San Jose, Calif.

[73] Assignee: Arnco Corporation, Westlake, Ohio

[21] Appl. No.: 793,770

[22] Filed: Nov. 1, 1985

[51] Int. Cl.⁴ ............................................. F16L 1/02
[52] U.S. Cl. .................................. 405/177; 405/175; 242/86.5 R; 254/273
[58] Field of Search ........ 405/164, 165, 168, 174–178, 405/180–183; 254/134.3 R, 134.3 FT, 270, 273; 242/86.5 R; 340/668, 677, 870.16, 870.28, 862.39, 862.44–862.46

[56] References Cited

U.S. PATENT DOCUMENTS

| 3,400,542 | 9/1968 | Davis | 405/183 X |
| 3,648,282 | 3/1972 | Kelly | 405/177 X |
| 3,720,070 | 3/1973 | Raves | 405/177 X |
| 3,788,575 | 1/1974 | Boettcher et al. | 242/86.5 R |
| 3,961,772 | 6/1976 | Sweeney | 254/270 X |
| 4,046,355 | 9/1977 | Martin | 254/273 |
| 4,458,880 | 7/1984 | Conti | 254/134.3 FT |
| 4,461,459 | 7/1984 | Conti | 254/270 X |

Primary Examiner—Cornelius J. Husar
Assistant Examiner—Nancy J. Stodola
Attorney, Agent, or Firm—Pearne, Gordon, McCoy & Granger

[57] ABSTRACT

A tractor provided with a cable reel at one end and a plow at the trailing end includes a system to monitor tension applied to the cable during underground placement. A capstan engages the cable while driven by a hyraulic motor and the pressure of the fluid supply to the motor is monitored by a pressure transducer. An electrical signal from the pressure transducer is fed to a control which also receives a setpoint signal corresponding to a maximum allowable tension on the cable. An output signal from the control is used to slow down or stop advancing movement of the vehicle and a second signal is used to operate a valve to divert fluid pressure from the hydraulic motor. Tension on the cable extending between the capstan and the reel can be monitored as well as tension on the cable between the capstan and the plow.

10 Claims, 2 Drawing Figures

SYSTEM TO CONTROL TENSION IN A CABLE DURING UNDERGROUND PLACEMENT

BACKGROUND OF THE INVENTION

This invention relates to a system for monitoring a capstan drive to control tension in a cable delivered to the capstan from a reel carried on a land vehicle which is propelled along a cable placement site, and more particularly, to such a system in which the land vehicle includes an implement to expose a subgrade for the simultaneous placement of the cable passing from the capstan for delivery from the vehicle.

It is a well-known practice to place cable underground, particularly telephone communication cable and electric utility cable along a track of land to supply a particular utility to a consumer. Sometimes a cable is pulled through an underground duct while, in other instances, the cable is placed directly in the ground at a subgrade without the use of a duct to form an enclosure. A land vehicle, such as a tractor, can be equipped with a plow to penetrate the soil to depths of 36 to 60 inches depending on the soil conditions, the protection required and other engineering requirements. Directly behind the plow, a relatively narrow opening is produced in the soil which is sufficient to feed a cable downwardly to the depth of the exposed subgrade. At a point immediately behind the plow there is a structure used to direct the cable beneath the ground level. The soil is allowed to collapse about the plowed opening whereby it is usually unnecessary to perform a backfilling operation along the plowed course. Procedures are, however, necessary to protect the cable from damage during the underground placement operation. Special handling requirements are usually specified by the manufacturer of the transmission cable. These requirements include a need to monitor the tension applied to the cable while it is being plowed into the underground placement site. The nature of such a cable placement operation requires the use of a tractor having a large tractive capacity which is necessary to pull the plow along a track at a depth to the desired subgrade for burying the cable. For this purpose, it is necessary to utilize a tractor having a pull capacity of 50,000 to 75,000 pounds.

The need to exercise special handling during placement of cable is particularly acute when placing communication cable using optical fibers rather than metal wires as a transmission medium. By way of a specific example, manufacturers of optical fiber cable typically specify that the cable can be subjected to no more than 400 to 1000 pounds of tension in a longitudinal tensile pull load and/or when wound about a radius such as a capstan wheel. The relatively high pull load capacity of the tractor used for the plowing operation and the relatively low limit to the maximum tension which can be imposed on most transmission cable, place several restrictions on the ability of an operator to monitor the cable tension while the cable is plowed into a subgrade. Should the actual tension on a specific portion of the cable approach the maximum allowable tension, almost immediate action is necessary to prevent cable damage. One manner for preventing cable damage comprises a stoppage of advancement by the tractor; however, it is not possible for an operator of the tractor to intuitively determine tension on the cable or continuously monitor cable tension because of the massive power capacity of the tractor as compared to the relatively low limit to the maximum tension which can be imposed on the cable.

The development of tension on the cable during the placement operation can be intentionally developed. Tension of the cable can also develop as the result of diverse influences occurring during the cable placement operation. For example, it may be necessary to steer the tractor or other vehicle along a course of travel which is curved, i.e., not linear. The vehicle may travel about a radius to which the plow is remote whereby a greater or lesser amount of cable is drawn from the vehicle, depending on whether the course of travel is concave or convex. Tension on the cable may undergo a dramatic increase should, for example, the supply reel come into contact with tree branches or other obstruction which prevents normal feeding of the cable from the reel. Tension on the cable can also change with a change to speed at which the vehicle advances along the ground. Thus, for example, should the speed of the vehicle increase, the tension on the cable will also increase, assuming that a constant drag was maintained on the cable supply reel carried by the vehicle.

In my U.S. Pat. No. 4,461,459, there is disclosed a tension meter which is connected between a pull line and a cable to provide a signal corresponding to the tension imposed on the cable by the pull line during placement in an underground duct. The tension signal is used to control the tension imposed on the pull line by a motor for a winch located at the end of the duct. However, because of the nature of the cable placement operation using a plow and eliminating a duct, such a tension measuring device cannot be utilized. The present invention utilizes a capstan to tension the cable passing along the vehicle between a supply reel and the entry site into an exposed subgrade. The drive system for the capstan includes a monitoring system responsive to tension in the cable upstream and/or downstream of the capstan.

SUMMARY OF THE INVENTION

It is an object of the present invention to provide a system for monitoring tension on a cable while carried on a vehicle during operation of an implement on the vehicle to expose a subgrade for buried placement of the cable during advancement of the vehicle.

It is a further object of the present invention to provide a tension monitoring system on a ground vehicle to monitor tension in a cable delivered from a supply reel carried on the vehicle through the production of a tension signal which varies in response to tension in the cable upstream of the capstan as well as downstream from a capstan while the drive for the capstan operates to maintain a predetermined tension on the cable.

It is a further object of the present invention to provide a tension monitoring system in which a signal is produced to automatically or, through control by an operator, stop advancing movement of a land vehicle when the tension level on a cable paid-out from the land vehicle reaches a predetermined maximum setpoint tension level.

More particularly, according to the present invention there is provided a system for controlling tension in a cable supplied from a reel carried on a land vehicle while propelled along a cable placement site, the land vehicle including an implement to expose a subgrade for buried placement of cable, the system including the combination of a capstan wheel to engage cable extending along a course between the reel and the subgrade, a drive motor connected to the capstan wheel for establishing forward tension on cable extending between the capstan wheel and the reel, control means to energize the drive motor for establishing the forward tension at a level less than a predetermined maximum setpoint tension level while the land vehicle advances along the cable placement site, means for producing a tension signal corresponding to tension in the cable extending along the course, and detector means responsive to the tension signal for indicating an increase in cable tension to the predetermined maximum setpoint tension level.

Preferably, the system of the present invention further includes means for producing an electrical setpoint signal corresponding to the maximum setpoint tension level and the detector means responsive to the electrical setpoint signal. The electrical setpoint signal may be produced by an adjustable potentiometer. The detector means may include a controller for adjusting the speed of propelled movement by the land vehicle along the cable placement site. Such a controller may, if desired, bring about automatic operation of an actuator to stop advancing movement of the vehicle.

The detector means may include an alarm to signal the operator of the land vehicle to cease or reduce the speed of the propelled movement by the land vehicle. It is advantageous to supply the aforesaid tension signal to a recorder such as a strip recorder. The drive motor for the capstan is preferably hydraulically powered and the aforesaid control means includes a pump for producing a pressurized supply of liquid medium and a valve to control the supply of pressurized liquid medium to the hydraulic motor. A pressure transducer is used to respond to the supply of pressurized liquid medium to the motor for indicating tension in the cable upstream and downstream of the capstan wheel by detecting a corresponding increase in pressure of liquid medium delivered for the hydraulic motor.

Figure 1:
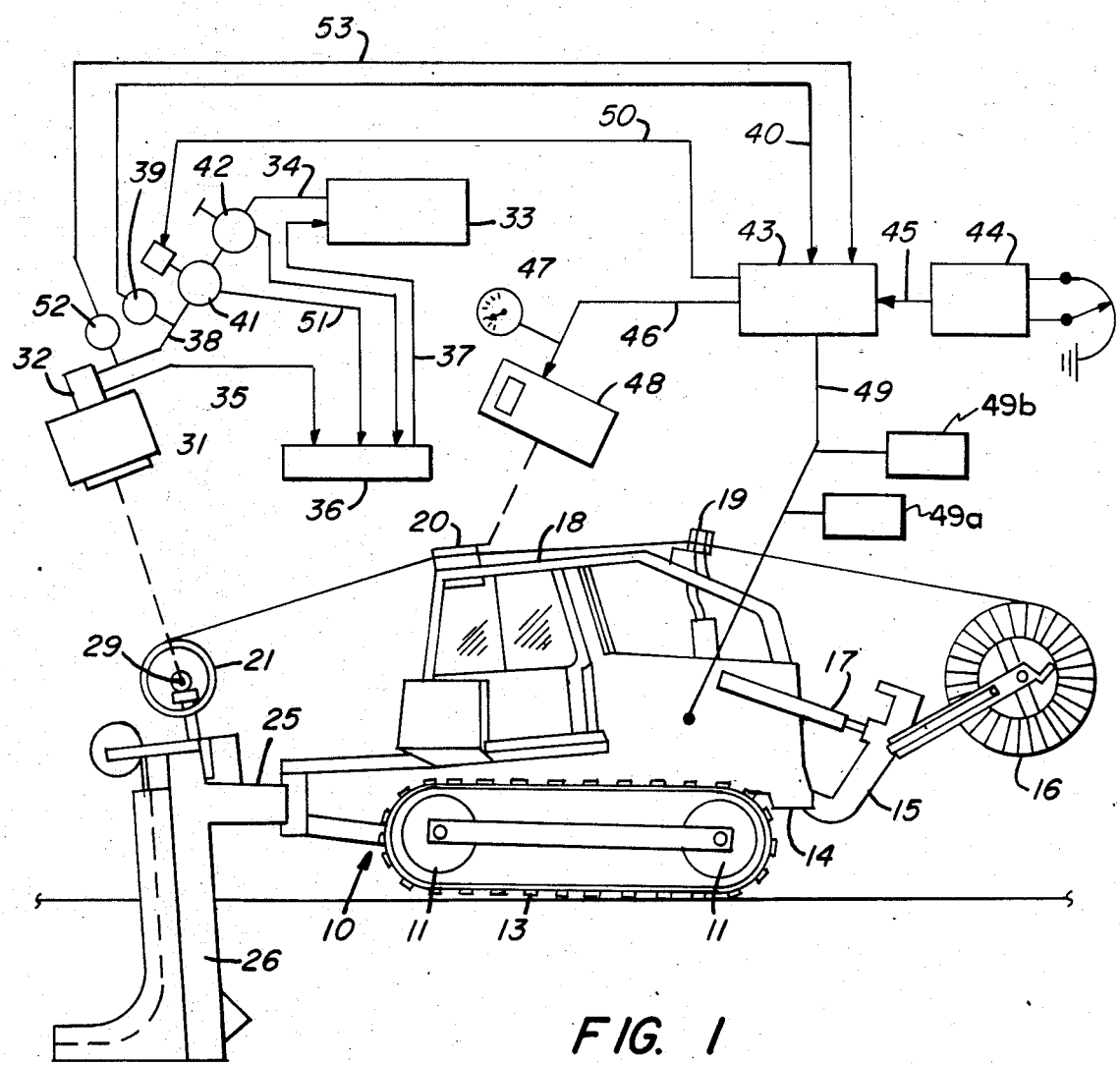

These features and advantages of the present invention as well as others will be more fully understood when the following description is read in light of the accompanying drawings, in which:

FIG. 1 is an elevational view schematically illustrating the preferred embodiment of the system of the present invention; and FIG. 2. is an enlarged view, in section, illustrating the arrangement of a plow and a cable guide member.

In FIG. 1, there is illustrated a land vehicle 10 which includes in a manner, per se, well known in the art, an internal combustion engine coupled to a transmission which is in turn coupled to drive assemblies including spaced-apart wheels 11 at each side of the vehicle forming part of crawler tracks having treads 13. A vehicle of this type is available from John Deere, Model 850B and identified as a long track dozer. The vehicle includes a chassis 14 and mounted for pivotal movement at the forward end of the chassis are arms 15 having at their outer ends a cradle to support a cable reel 16. Piston and cylinder assemblies 17 are supported at each side of the chassis and have their rod ends connected to the arms 15 to receive a cable reel at ground level and lift the reel to a desired elevation for paying out cable while transported by the vehicle. Above the chassis, there is a roof structure 18 upon which there is located a forward restraining guide 19 and a trailing restraining guide 20. The guides 19 and 20 preferably take the form of a horizontal roller and a U-shaped bar above the roller forming a rectangle flow space into which the cable passes. From guide 20, the cable is directed to a capstan 21 rotatably supported by suitable bearing blocks on upstanding pedestals that are mounted on the top portion of horizontally-extending plow bars 25. The plow bars are pivotally supported on the chassis and their rearwardly-extending ends are connected to a plow 26. The plow can be raised and lowered through the operation of actuators such as piston and cylinder assemblies so that the working depth of the plow can be selected to expose a subgrade for buried placement of cable. As shown in FIG. 2, the trailing edge of the plow is secured by welding or other means to a guide 27 having a vertical passageway 28 which receives the cable passing from the capstan. The vertical passageway extends to a lower extent of plow depth where the passageway extends horizontally so that a cable can freely pass from the guide onto the base of the exposed subgrade. As cable emerges from the guide, the earth walls which have been created by the operation of the advancing plow are allowed to collapse on the cable and backfilling, if necessary, is carried out to complete the buried placement of the cable. It will be understood, of course, that the width of the plow which is drawn through the soil is relatively narrow, e.g., 3 inches or less. In the fall space for the cable between the capstan and the upper end of the guide 28, there is arranged a supply reel to payout marking tape which is concurrently fed into the guide with the cable. The marking tape serves to provide identification indicia of the buried cable should it be unearthed at some time in the future.

A support shaft 29 for driving the capstan 21 is connected by a suitable coupling to a hydraulic motor 31. The motor includes a rotary fluid coupling 32 to receive pressurized hydraulic fluid delivered from a pump 33 by a line 34 and discharge hydraulic fluid by line 35 to a reservoir 36. A line 37 supplies the pump 33 with fluid from the reservoir. A manifold 38 is provided in line 34. Connected to the manifold is a pressure transducer 39 which produces an electrical signal in line 40 corresponding to the pressure of the fluid delivered to the hydraulic motor. Also connected to the manifold 38 are a solenoid-operated valve 41 and a manually-operated valve 42. Valve 42 can be adjusted to maintain a desired pressure at which fluid is supplied from the pump so that the hydraulic motor is driven to pull cable from the reel under a normal forward working tension of, for example, about 50 pounds. A brake or even a workman may apply a suitable restraining force to the cable reel to prevent an unrestrained overspeed of the reel.

The electrical signal which is produced by the transducer 39 is fed by line 40 to a control 43. Control 43 also receives an adjustable setpoint signal produced by a potentiometer 44 and delivered by line 45 to the control. The adjustable setpoint signal corresponds to an allowable maximum tension which can be imposed on the cable. One output signal from the control 43 is a signal delivered by line 46 to a tension meter 47 to indicate the actual tension which is imposed on the cable. The signal in line 46 may also be fed to a strip chart 48 to maintain a permanent record of the tension imposed on the cable during the entire placement operation. The strip chart and tension meter are preferably situated in the driver's cab of the land vehicle. A second signal is produced by the control 43 and is delivered by line 49 to either an alarm or to a solenoid controller 49a to adjust the speed of advancing movement by the vehicle. Such a solenoid controller can be used when the drive system for the vehicle can be automatically controlled without damage to the propulsion system. Usually, the signal 49 will be used to disengage the tractor drive from the transmission or internal combustion engine. A third signal is generated by the control 43 simultaneously with the signal in line 49. This third signal is delivered by line 50 to the solenoid-operated valve 41 to direct the flow of pressurized fluid from the manifold by a line 51 to the reservoir 36 whereby the hydraulic motor no longer drives the capstan to tension the cable.

By measuring the pressure of the hydraulic fluid supplied to the motor for the capstan, tension in the cable can be monitored in two critical directions. First, as the cable comes off the reel, a forward tension which is placed on the cable reel is established by the delivery of hydraulic fluid at a pressure preset by the manually-operated valve 42. The forward tension is monitored by the the signal produced by the pressure transducer 39. Should the cable reel come into contact with an obstruction, such as tree branches, the reel may be stopped and tension on the cable will quickly increase. Should the tension in the cable exceed the adjustable setpoint established by the potentiometer 44, fluid is immediately diverted from the hydraulic motor by the solenoid-operated valve 41 and advancing movement of the vehicle is stopped in response to the signal in line 49 either by intervention by the operator in response to an audible alarm 49b or automatically by use of the signal to operate a solenoid controller 49a.

A second manner by which tension can be applied to the cable and must be monitored during the placement operation occurs as the tractor changes speed or hits an obstruction or changes direction. In any of these events, tension on the cable is increased downstream of the capstan between the capstan and the cable discharge site of the guide 27. Pressure in the hydraulic circuit for the capstan motor will increase when the cable is tensioned at the guide attached to the plow. The motor 31 is driven so that the motor shaft turns faster than normally established by the setting of the manual valve, thereby producing a corresponding increase to the hydraulic pressure in the manifold. The increased pressure is measured by the transducer 39 and the electrical signal fed in line 40 to the control 43 brings about operation of the system in the manner described hereinbefore.

It is preferred to install a second transducer 52 in the manifold to provide a signal in line 53 when the hydraulic pressure drops below a preestablished level. The signal from the second transducer is delivered to the control 43 which in turn produces a signal in line 49 to bring about an operator alarm and/or automatic stoppage to advancing movement of the tractor. The low-pressure signal from the transducer 52 prevents damage to the cable should an improper trip-point setting be established by a potentiometer 44. When the drive motor for the capstan is not operating due to adjustment of the manual valve, the tractor must also be stopped to avoid damage to the cable.

It is to be understood that the control 44 preferably operates so that as tension in the cable increases and approaches the trip-point setting, the tractor can be slowed down to reduce tension on the cable. This improves the overall productivity by avoiding stoppage to the tractor. However, when the tension in the cable reaches the trip-point setting, the signal produced by the control must be utilized to bring about an immediate stoppage of the tractor to prevent damage to the cable.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A system for controlling tension in a cable supplied from a reel carried on a land vehicle while propelled along a cable placement site, said land vehicle including an implement to prepare a subgrade for buried placement of the cable, said system including the combination of:

a capstan wheel operatively engaging the cable extending along a course between said reel and subgrade.

a drive motor connected to said capstan wheel for establishing tension on the cable extending between said capstan wheel and said reel, control means to energize said drive motor for establishing said tension at a level less than a predetermined maximum setpoint tension level while said land vehicle advances along the cable placement site, means for producing a tension signal corresponding to tension in the cable extending along said course, and detector means responsive to said tension signal for indicating an increase in cable tension to the predetermined maximum setpoint tension level.

2. The system according to claim 1 further including means for producing an electrical setpoint signal corresponding to said predetermined maximum setpoint tension level, said detector means being responsive to said electrical setpoint signal.

3. The system according to claim 2 wherein said means for producing an electrical setpoint signal includes an adjustable potentiometer.

4. The system according to claim 1 wherein said detector means includes a controller for adjusting the speed of propelled movement by the land vehicle along the cable placement site.

5. The system according to claim 1 wherein said detector means includes an alarm.

6. The system according to claim 1 further including recorder means responsive to said tension signal.

7. The system according to claim 1 wherein said drive motor includes a hydraulically-powered motor.

8. The system according to claim 7 wherein said control means includes a pump for producing a pressurized supply of liquid medium, and a valve to control the supply of pressurized liquid medium to said hydraulic motor.

9. The system according to claim 8 wherein said means for producing a tension signal includes a pressure transducer responsive to the pressurized liquid medium supplied to said hydraulic motor from said valve.

10. The system according to claim 9 further including valve means responsive to said detector means for directing pressurized fluid medium from said hydraulic motor.

* * * * *